United States Patent [19]

Hunter

[11] 4,357,954
[45] Nov. 9, 1982

[54] BACKFLOW PREVENTING VALVE CONSTRUCTION

[75] Inventor: Edwin J. Hunter, Rancho Santa Fe, Calif.

[73] Assignee: The Toro Company, Minneapolis, Minn.

[21] Appl. No.: 170,854

[22] Filed: Jul. 21, 1980

[51] Int. Cl.³ .............................................. F16K 24/00
[52] U.S. Cl. ................................. 137/218; 137/529; 137/535; 137/540; 251/61.1
[58] Field of Search ........... 137/529, 535, 540, 543.15, 137/218; 251/61.1

[56] References Cited

U.S. PATENT DOCUMENTS

| | | | |
|---|---|---|---|
| 1,191,376 | 7/1916 | Weber | 137/543.15 |
| 3,173,439 | 3/1965 | Griswold et al. | 137/218 X |
| 3,724,487 | 4/1973 | Hunter | 137/218 |
| 4,080,980 | 3/1978 | Hunter | 137/218 |
| 4,231,387 | 11/1980 | Dixon | 137/218 |

FOREIGN PATENT DOCUMENTS

| | | | |
|---|---|---|---|
| 519084 | 12/1955 | Canada | 137/218 |
| 618981 | 3/1961 | Italy | 137/535 |
| 675254 | 7/1979 | U.S.S.R. | 137/535 |

*Primary Examiner*—H. Jay Spiegel
*Attorney, Agent, or Firm*—Poms, Smith, Lande & Rose

[57] ABSTRACT

An improved check valve for a backflow preventing valve of the type having an inlet passage, an intermediate chamber, and an outlet passage, includes a stationary valve port fluidly communicating with the intermediate chamber, a movable contoured valve seat for sealing the port, and a valve closing apparatus in rolling engagement with the valve seat and responsive to the pressure differential thereacross. The valve closing apparatus urges the valve seat to a valve closed position and includes a stationary shaft, a pair of rollers, and a spring. The spring biases the rollers against the contoured valve seat to thereby effect the closure of the seat member against the valve port. An improved exhaust valve is also provided and includes a balanced valve member providing a path between the intermediate chamber and the atmosphere when in a valve open position. The balanced valve member is resiliently biased between a valve seat and a moveable diaphragm. The diaphragm compares the inlet passage and intermediate chamber pressures and maintains the valve closed when the inlet passage pressure is greater than the intermediate chamber pressure, while moving to absorb fluid displacements from the intermediate chamber caused by large reductions in the inlet passage pressure.

15 Claims, 5 Drawing Figures

BACKFLOW PREVENTING VALVE CONSTRUCTION

FIELD OF THE INVENTION

The present invention relates in general to backflow preventing valves and in particular to check valve and exhaust valve constructions for use in backflow preventing valves.

BACKGROUND OF THE INVENTION

Backflow preventing valves are used in irrigation systems and the like to ensure unidirectional fluid flow. In large irrigating systems, various fertilizers and nutrients are typically mixed in with the water that is sprayed or otherwise supplied to crops. As a municipal water main usually provides a common supply of water for all domestic and commercial uses in an area, it is important to prevent the backflow of these fertilizers and nutrients to avoid contaminating the portion of the water used for domestic purposes.

Much effort has been expended in the development of backflow preventing valves which quickly close under conditions which normally cause backflow, such as back pressure or siphonage. As the usual design for a backflow preventing valve includes an inlet passage and an outlet passage, each respectively communicating with an intermediate chamber via an inlet check valve and an outlet check valve, much work has been done to develop the inlet and outlet check valve portions of the backflow preventing valves to ensure a rapid and definite closure for increases in the pressure of the fluid in the outlet passage relative to that in the inlet passage.

For example, in my prior U.S. Pat. No. 3,724,487, I disclosed a backflow preventing valve utilizing a check valve design having a spring urging a piston-type valve seat into a valve port. In my U.S. Pat. No. 4,080,980, I disclosed an improvement to my previous patent in which the inlet and outlet check valves included a booster means cooperating with the spring for forcibly closing the valve without providing an undesirable increased resistance to opening after reaching an initial opened position. The booster means included a cylindrical shaft having rollers biased thereon. When the valve was approaching a closed position, the rollers entered a reduced portion of the shaft which, in combination with a spring biasing the rollers against the shaft, assisted the piston spring in forcibly closing the valve.

Other booster designs have included contoured valve seat stems providing camming surfaces for rollers that are resiliently biased thereagainst. These camming surfaces and rollers maintain a uniform force on the stem after the valve has initially opened and assist the spring in closing the valve. In general, however, the check valve camming arrangements found in the prior art require several moving parts and provide only a limited amount of boost, and are limited in the manner in which the boost is applied.

Developments have also been made in the design of the exhaust valve portion of the backflow preventing valve. The exhaust valve communicates with the inlet passage and intermediate chamber and is used to gate the intermediate chamber fluid to the atmosphere when the pressure in the intermediate chamber rises relative to the inlet passage pressure as the inlet and outlet check valves are closing in a backflow situation. The problem plaguing most exhaust valves is that intermediate chamber fluid is gated to the atmosphere for only transient pressure increases of the intermediate chamber fluid relative to the inlet passage fluid. This pressure increase is caused by displacement of the intermediate chamber fluid as large pressure reductions occur in the inlet passage fluid. This "spitting" by the exhaust valve is undesirable for such momentary pressure increases.

The exhaust valves of the prior art generally have not solved the "spitting" problem, as they generally employ unsophisticated valving arrangements. Even in those exhaust valves which have reduced "spitting", their valving mechanisms are mechanically complicated and susceptible to wear.

Finally, the backflow preventing valves of the prior art are generally bulky devices utilizing large intermediate chambers. The large intermediate chambers have been required because of the relatively large inlet and outlet check valves and exhaust valves used therewith. A more compact design for the check valves and exhaust valves would greatly contribute to reducing the bulkiness of the current backflow preventing designs. A backflow preventing valve utilizing a low-profile valve body could be used in many applications where mounting space tends to be a problem.

Accordingly, it is the principal object of the present invention to simplify the design of the check valve portions of a backflow preventing valve.

It is another object of this invention to control the manner in which the inlet and outlet passages of backflow preventing valves are closed.

It is still another object of this invention to rapidly and efficiently close the check valve portion of a backflow preventing valve.

It is yet another object of this invention to provide a more compact check valve and exhaust valve design for use in a backflow preventing valve.

It is a further object of this invention to provide a highly-durable check valve in a backflow preventing valve.

It is another object of this invention to reduce the spitting action of the exhaust valve portion of a backflow preventing valve by absorbing transitory fluid displacements from the intermediate chamber for large reductions in inlet pressure.

It is still another object of this invention to both simplify the design of the exhaust valve portion of a backflow preventing valve and to prevent the spitting from occurring.

It is a further object of this invention to provide a high-durable exhaust valve in a backflow preventing valve.

It is still another object of this invention to provide a low-profile backflow preventing valve applicable to a wide variety of uses.

It is yet another object of this invention to prevent the contamination of the supply fluid to which a backflow preventing valve is connected.

SUMMARY OF THE INVENTION

The present invention, in a broad aspect, provides an improved check valve for a backflow preventing valve of the type having a body with an inlet passage for connection to a source of fluid, an intermediate chamber fluidly connected to the inlet passage via one check valve, and an outlet passage fluidly connected to the intermediate chamber via a second check valve for connection to a receiver of fluid. The improved check valve includes a stationary valve port fluidly communicating with the intermediate chamber, a movable contoured valve seat for sealing the valve port, and a valve closing apparatus in rolling engagement with the valve seat and responsive, in the inlet and outlet check valves, to the differences in the pressure of the fluid in the intermediate chamber and the fluid in the inlet and outlet passages. The valve closing apparatus urges the valve seat to a valve closed position against the valve port when the fluid pressure at the outlet passage increases relative to the fluid pressure at the intermediate chamber.

In accordance with one feature of the invention, the movable valve seat has a frustoconical outer surface providing camming contours for rolling engagement with the valve closing apparatus.

In accordance with still another feature of the invention, the valve closing apparatus includes a stationary shaft mounted to the backflow preventer body for sliding engagement with an axial cavity in the movable valve seat. A pair of rollers connected to a pair of arms attached to the backflow preventer valve body for arcuate movement in a plane parallel with the shaft, are positioned upon the contoured outer portion of the valve seat. A spring member, interconnecting the arms, biases the arms and thus the rollers against the contoured valve seat and thereby effects the closure of the seat member against the valve port.

In accordance with another feature of the invention, an improved exhaust valve, communicating with the inlet passage and with the intermediate chamber, resists the gating of fluid from the intermediate chamber to the atmosphere for only transient increases in the pressure of the fluid in the intermediate chamber relative to the pressure of the fluid in the inlet passage.

In accordance with a further feature of the invention, the improved exhaust valve includes a valve body communicating with the backflow preventer body and with the atmosphere, and provisions for sensing the intermediate chamber and inlet passage pressures. A movable diaphragm in separate sealing communication with the inlet passage and with the intermediate chamber moves in response to pressure changes of the fluids therein. A balanced valve member, resiliently biased between the movable diaphragm and a stationary seat in the valve body provides a path between the intermediate chamber and the atmosphere when in a valve open position. The resilient biasing of the valve member enables the exhaust valve to accommodate the fluid displacement changes that occur in the intermediate chamber as the result of large pressure reductions of the fluid in the inlet passage. The "spitting" associated with the prior art exhaust valves is thereby eliminated.

In accordance with another feature of the invention, the resilient biasing for the valve member utilizes a pair of springs disposed on either side thereof. The first spring is positioned between valve and the movable diaphragm. The second spring is positioned between the valve and the stationary seat. The second spring urges the valve member to a valve open position and thereby determines the differential pressure (between the fluids in the inlet passage and intermediate chamber) across the diaphragm at which the valve opens. The first spring transfers the differential pressure across the diaphragm to the valve member to close the valve and allows the diaphragm to move to absorb a certain amount of fluid displacement from the intermediate chamber as a result of transitory fluid pressure increases in the intermediate chamber. This arrangement absorbs differential pressure changes between the differential pressure at which the valve opens and the differential pressure normally occurring between the inlet passage and intermediate chamber when fluid is flowing through the backflow preventing valve.

In accordance with a final feature of the invention, the improved check valve and exhaust valve portions of the backflow preventing valve are of compact design, thereby providing the overall design of the backflow preventing valve with a low profile.

Other objects, features, and advantages of the present invention will become apparent from a consideration of the following detailed description and from the accompanying drawings.

DETAILED DESCRIPTION

Figure 1:
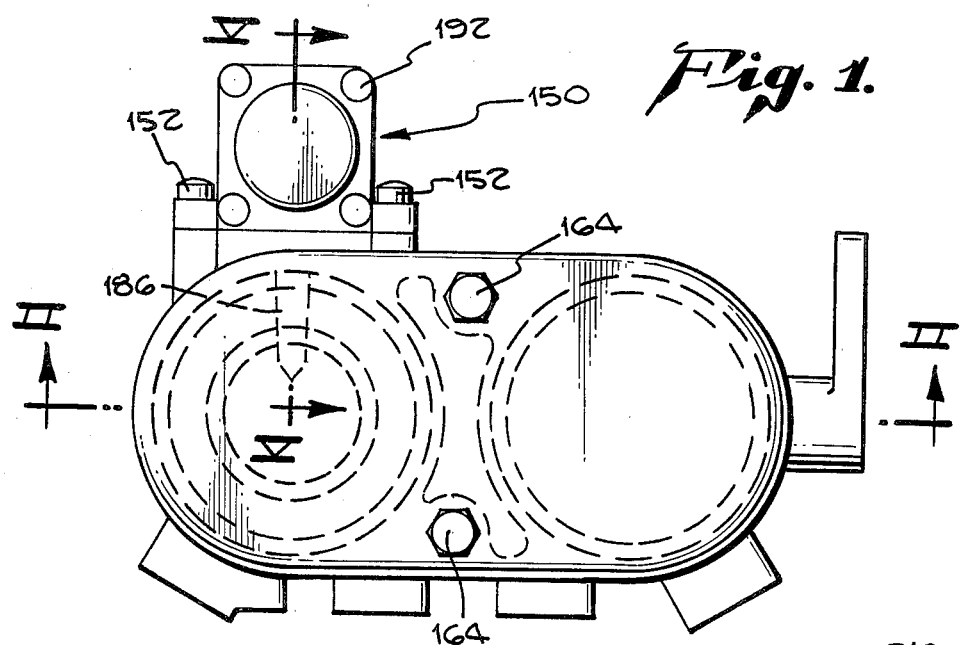
FIG. 1 shows a top plan view of an improved backflow preventing valve according to the present invention.
Figure 2:
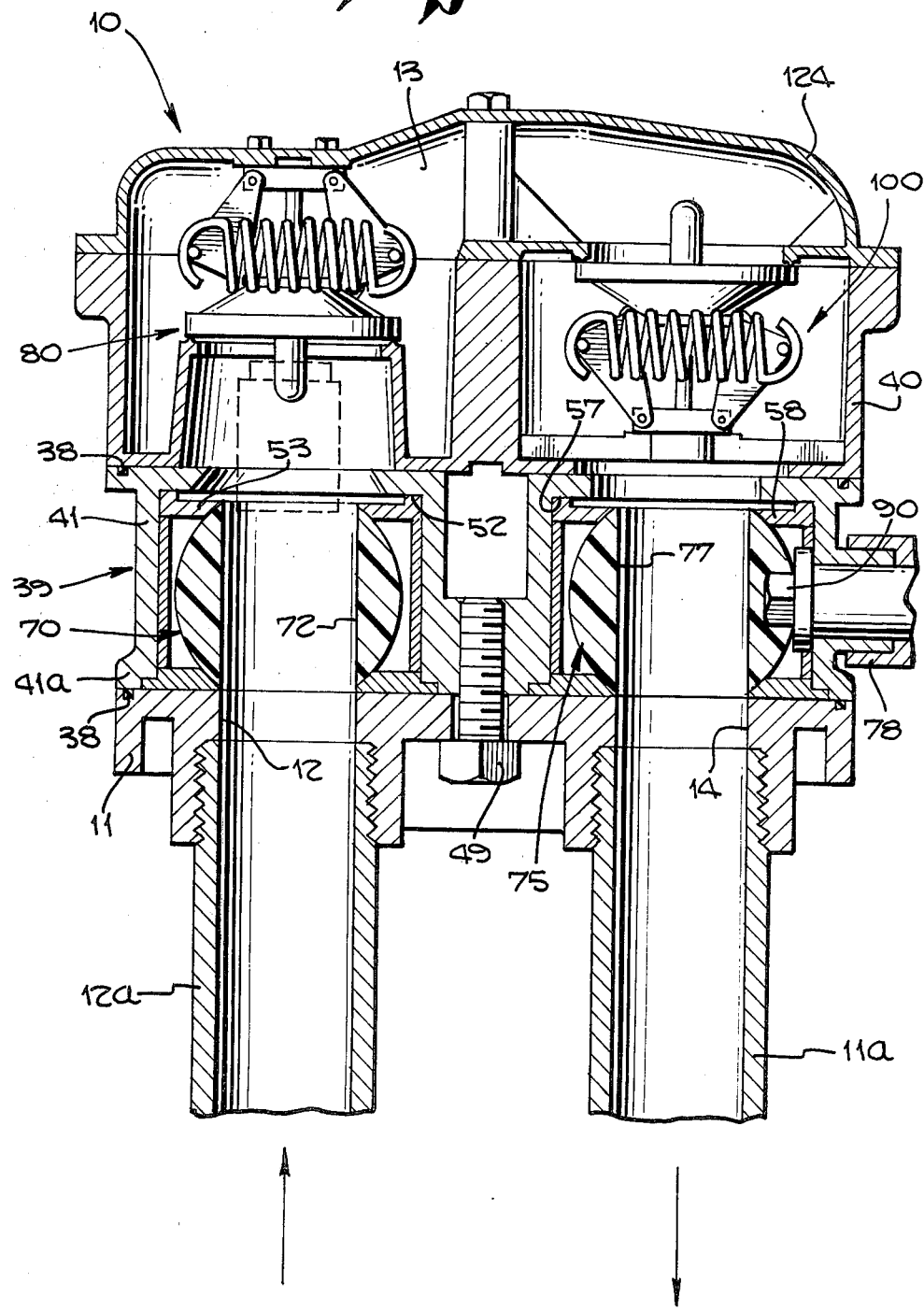
FIG. 2 shows a cross-sectional view of the backflow preventing valve of FIG. 1, taken through the plane II—II.

Referring now to the drawings and particularly to FIGS. 1 and 2, the preferred exemplary embodiment of an improved backflow preventing valve according to the present invention is generally denoted 10. The valve 10 is for installation in an irrigation or other fluid-oriented system having a source of fluid and a receiver for fluid which are to be kept separate except when there are suitable pressures to cause flow from the source to the receiver. The instant invention is an improvement of the backflow preventing valves described and claimed in my U.S. Pat. Nos. 3,724,487 and 4,080,980, and reference should be made thereto for examples of the uses for such a system.

Generally, the valve 10 includes a valve housing including a lower valve body 11, an intermediate valve body 39, an upper valve body 40, a housing cap 124, and an exhaust valve body 150, all with holding means such as bolts 49, 152 and 164 for holding the parts together. All of these parts may be secured together in any suitable manner with O-rings 38 provided, as shown, where necessary. As discussed in my prior patents, all of these components may comprise a plurality of molded parts.

Fluid from a source of fluid (not separately shown) enters the valve body 10 through an inlet passage 12 in the lower valve body 11. The inlet passage 12 is coupled to an inlet 12a from the source of fluid. From the inlet passage 12, the fluid passes into an intermediate chamber 13 formed by the upper valve body 40 and housing cap 124. The chamber 13 is fluidly connected to the inlet passage 12 via an inlet check valve 80. From the intermediate chamber 13, the fluid passes to an outlet passage 14, which is fluidly connected to the intermediate chamber 13 by an outlet check valve 100 for connection to an outlet 11a leading to a receiver of fluid (not separately shown). The inlet passage 12 and the outlet passage 14 are both molded apertures in the lower housing body 11. Also, the inlet passage 12 and the outlet passage 14 are internally threaded as shown for receiving the inlet 12a and the outlet 11a therein.

The lower valve body 11 also forms the lower portion of a pair of ball valves 70 and 75, which are provided for controlling the fluid flow through the inlet passage 12 and the outlet passage 14, respectively. The lower valve body 11 may be similar to that described in my prior U.S. Pat. No. 3,724,487. The inlet ball valve 70 is mounted within a valve chamber 52 having therein a valve seal 53. The outlet ball valve 75 is mounted within a second valve chamber 57 having therein an outlet ball valve seal 58. The seals 53 and 58 permit the rotation of the ball valves 70 and 75 to place ball valve apertures 72 and 77 in respective alignment with the inlet passage 12 and the outlet passage 14. The intermediate body 39 includes a cylindrical side wall 41 with a peripheral flange 41a for abutting contact with the upper surface of part 11 for securement thereto in any suitable manner, such as gluing, bolting, etc, to retain the inlet and outlet ball valves 70 and 75 therebetween.

A handle 78, connected to the outer barrel valve 75 by a drive shaft 90, extends out of the housing body 40 and terminates in a transversely-extending outer handle portion as shown in FIG. 1. Both ball valves 70 and 75 are rotated in a similar fashion. The structure for rotating the ball 70 is not shown for convenience of illustration. Thus, the inlet ball 70 is rotatable via the handle 78 between an open position, wherein the aperture 72 is aligned with the inlet passage 11 and inlet check valve 80, and a closed position where no such alignment occurs. Similarly, the outlet ball valve 75 is rotatable between an open position, wherein the aperture 77 is aligned with the outlet passage 14, and a closed position. The fluid flow, which is manually controlled by the ball valves 70 and 75, is also automatically controlled against backflow by the check valves 80 and 100.

Figure 3:
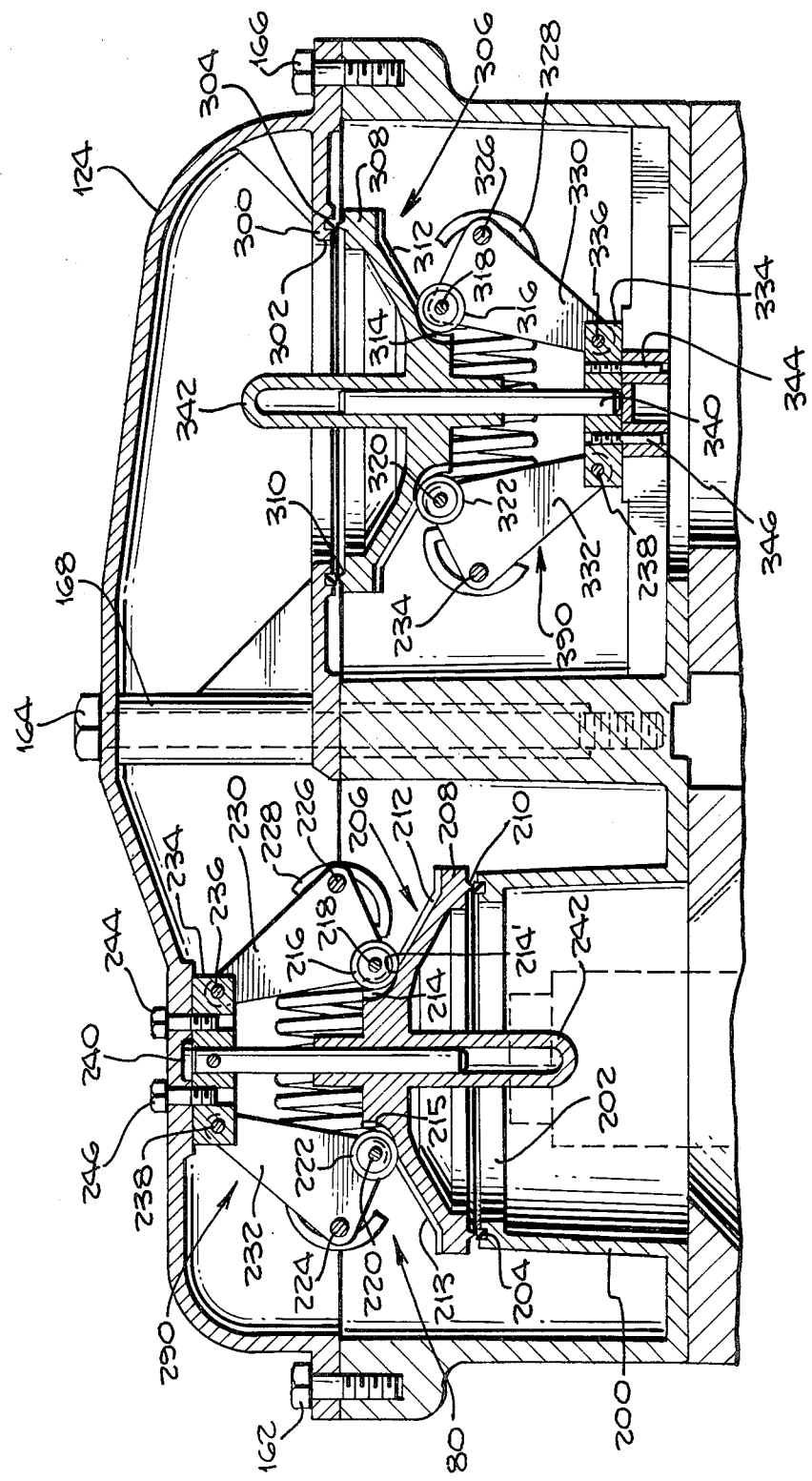
FIG. 3 shows an enlarged view of the inlet and oulet check valve portions of the backflow preventing valve shown in FIG. 2, with the check valves in a valve closed position.
Figure 4:
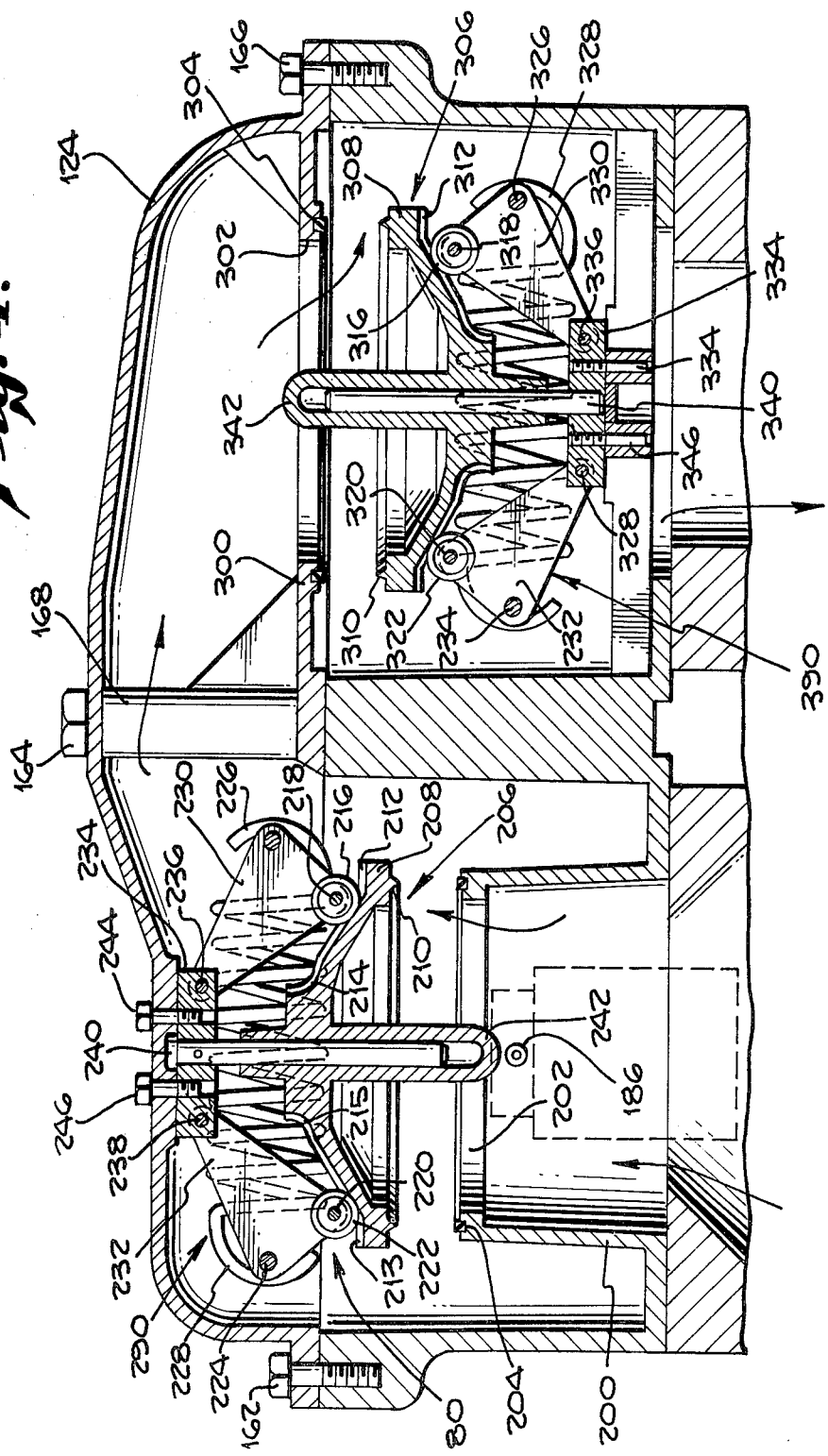
FIG. 4 shows an enlarged view of the inlet and outlet check valve portions of the backflow preventing valve shown in FIG. 2, with the check valves in a valve open position.

FIGS. 3 and 4 show, in detail, the construction of the inlet check valve 80 and the outlet check valve 100. FIG. 3 shows the check valves in a closed position, as would be the case when there is no fluid flow through the unit. FIG. 4 shows the inlet and outlet check valves 80 and 100 in an open position allowing fluid to pass from the inlet passage 12 through the intermediate chamber 13 and to the outlet passage 14.

Referring to FIG. 3, the inlet check valve 80 includes a raised cylindrical valve port 200 having a generally circular opening 202 at one end. The upper portion of the valve port 200 includes a square "O"-ring 204 to aid in the sealing of the inlet passage 12. Disposed adjacent the valve port 200 is a movable valve seat 206. The outer surface of valve seat 206 is generally frustoconical and includes a peripheral flange 208, a generally conical middle body portion 212 functioning as a camming surface, and a generally concave upper body portion 214. At the edge of the peripheral flange 208 is a sharp circular ridge 210 which is moved into abutting relation with square ring 204 when the inlet check valve 80 is in a closed position as shown in FIG. 3. Downwardly depending through the axial center of the valve seat 206 is an elongated cylindrical cavity 242.

It is to be noted that, while FIGS. 3 and 4 show the movable valve seat member 206 to be generally circular, the present invention could be practiced with a non-circular valve seat 206 having two inclined ramping surfaces 212 and 213 and two generally concave upper portions 214 and 215 symmetrically disposed on opposite sides of the movable valve seat 206.

The particular configuration of the movable seat 206 portion of the inlet check valve 80 is designed to cooperate with a valve closing mechanism rigidly affixed to the housing cap 124. As shown in FIG. 3, the valve closing mechanism includes a shaft member 240 positioned within the circular cavity 242 of the valve seat 206, a pair of arm members 230 and 232 rotatably attached via pins 238 and 236 to a bar member 234 attached to the housing cap by screws 246 and 244. The arm members 230 and 232 are rotatably attached to the bar member 234 for coplanar arcuate movement on opposite sides of the shaft 240. The arm members 230 and 232 are urged toward the shaft 240 by means of a spring member 228 mounted therebetween upon pins 224 and 226.

Rolling engagement between the arm members 230 and 232 and the movable seat 206 is made with two cam rollers 222 and 216 mounted via axles 220 and 218 to the arm members 230 and 232. These rollers 216 and 222 may be mounted, by teflon bearings or the like, to the shafts 218 and 220, which themselves may be of a relatively small diameter. These rollers 216 and 222 transfer the biasing force of the spring member 228 to the movable seat 206 to urge it to a closed position against the valve port 200 when the pressure in the intermediate chamber 13 is greater than that in the inlet passage 12. Concerning the relatively small diameter of the shafts 218 and 220 supporting the rollers 216 and 222, the shafts may be as small as $\frac{1}{8}$ inch for a valve opening 200 approximately 6 inches in diameter and may be approximately 1/32 inch in diameter for a one-inch valve opening.

As shown in FIG. 4, when the pressure of the fluid in the inlet passage 12 is greater than that in the intermediate chamber 13 plus the biasing force of the spring member 228, the valve seat 206 is urged upwardly on the shaft 240 by the inlet fluid pressure until the rollers 216 and 222 are at the bottom end of the outer conical section 212 of the valve seat 206, whereupon fluid flows freely through the check valve 80. As the pressure of the fluid in the inlet passage 12 decreases relative to that in the intermediate chamber 13, the spring member 228 urges the valve seat 206 toward the valve port 200 by means of the rollers 216 and 222 traveling on the conical section 212 of the valve seat. The seat 206 thereby reaches a valve closed position against the part 200 and fluid flow through the check valve 80 ceases. The flow of fluid through the check valve 80 thus opens and closes the valve.

When the valve seat 206 is fully closed against the valve port 200, the rollers 216 and 222 are positioned in a flattened area 214' of the concave upper portion 214 of the valve seat 206. This flattened area 214' increases the closing force and the pressure differential when the check valve is in a low-flow position. The change in the outer slope of the conical section 212 of the seat 206 to a more flattened section 214' in the concave area 214 also provides an initial opening resistance for the valve seat 206, thereby insuring that the pressure of the fluid in the inlet passage 12 is definitely greater than the fluid in the intermediate chamber 13 prior to the opening of the valve.

When the valve is in a closed position with the rollers 216 and 222 on the flattened area 214' 206, an opening force of approximately 6 pounds per square inch with the appropriate spring tension 228 can be required. Once the valve has opened, and the rollers are on the conical portion 212 of the valve seat 206, the required opening force can drop to approximately 3 pounds per square inch. When the rollers have reached the peripheral flange 208, the opening force is approximately 2 pounds per square inch.

The upper portion of concave upper surface 214 also provides a stop for the rollers 216 and 222 when the check valve is removed from the unit. When the check valve is assembled in the backflow preventing unit, the rollers 216 and 222 are then resting on the flattened section 214', and are clear of the upper portion of the concave area 214.

As can be appreciated from the foregoing, the improved check valve of the present invention is a extremely compact unit utilizing only a limited number of moving parts. The check valves found in the prior art generally use a circular piston member supporting an axial spring which urges the piston member to a valve closed position. As such, the assembly containing the piston and its accompanying spring member tends to be rather lengthy and thereby obviates any possibility for compact installation. In addition to providing a compact design, the improved check valve of the present invention insures a much lower pressure loss through the unit at high flow rates than do the piston-type check valves of the prior art.

The outlet check valve 100 is almost identical in construction to the inlet check valve 80 and thus the same structure appears in each and the description of one valve is the same as that for the other. As shown in FIGS. 3 and 4, the outlet check valve 100 includes a valve port 300 containing a valve opening 302 therein and supporting an O-ring 304. Disposed adjacent the valve port 300 for abutting engagement therewith is a movable valve seat 306 supported on a shaft 340 fixedly mounted to the apparatus. As discussed previously, the valve seat 306 includes a peripheral flange 308 having molded thereon a ridge 310 for engagement with the square "O"-ring 304. The valve seat 306 includes a conical camming surface 312 adjacent the peripheral flange 308 and terminating in a concave section 314.

The valve seat 306 is urged against the valve port 300 by a valve-closing mechanism 390 including the shaft 340, a pair of arm members 330 and 332 attached by pins 336 and 338 to a bar 334 connected to the upper body 340 by means of screws 346 and 344. The arms 330 and 332 are disposed for arcuate movements on opposite sides of the shaft 340 and support a spring member 328 by means of pins 324 and 326. The arms 332 and 330 also support, via axles 320 and 318, a pair of rollers 316 and 322.

The rollers 316 and 322 engage the conical portion 312 of the valve seat 306 and transfer the biasing force of the spring member 328 to the valve seat 306. As such, the conical surface 312 acts as a cam and the rollers 316 and 322 function as cam rollers in urging the valve seat 302 against the valve port 300 when the pressure in the intermediate chamber 13 is less than the pressure in the outlet passage 14 plus the biasing force of the spring member 328. As such, the outlet check valve 100, like the inlet check valve 80, is responsive to the pressure differential between the intermediate chamber 13 and the appropriate inlet or outlet passage 12 and 14. Therefore, the flow or volume of fluid flowing through the outlet check valve 100 determines the position of the check valve.

The outlet check valve 100, like the inlet check valve 80, is of a compact design because of the novel arrangement of the valve seat 306 and the valve closing apparatus 390, by which the valve seat 306 moves upon the shaft portion 340 of the valve closing mechanism 390 and is urged to a closed position against the valve port 300 by the camming action provided by the rolling engagement between the rollers 316 and 322 and the conical section 312 of the valve seat 306.

The novel inlet and outlet check valves 80 and 100 used in the present invention allow the housing cap 124 a portion of the backflow preventing valve 10 to have an extremely low profile, thereby reducing the size of the intermediate chamber 13 and allowing use of the valve 10 in applications where space is at a premium. The improved backflow preventing valve of the present invention is approximately two-thirds of the height of the backflow preventing valve in my prior U.S. Pat. No. 4,080,980 and other similar backflow preventers.

Figure 5:
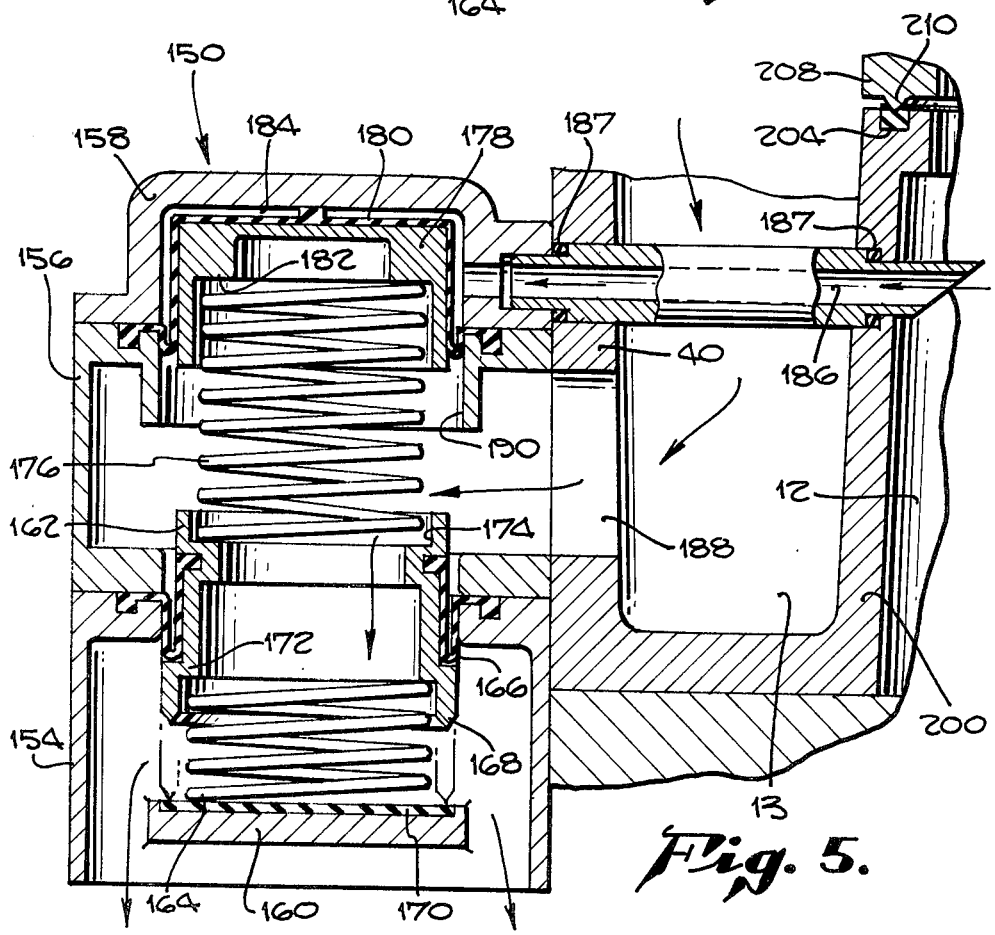
FIG. 5 shows a cross-sectional view of the exhaust valve portion of the backflow preventing valve of FIG. 1, taken through the plane V—V.

The novel features of the improved backflow preventing valve of the present invention are also provided by the exhaust valve 150 attached to the apparatus. As shown in FIGS. 1 and 5, the exhaust valve 150 is attached to the upper body 40 portion of the backflow preventing valve 10 via screws 152 or similar fastening means. The exhaust valve 150 includes a 3-part body including a lower body 154 communicating with the atmosphere, an intermediate body 156 communicating with the lower body and with the intermediate chamber 13, and an upper body 158 communicating with the intermediate body 156 and with the inlet passage 12. The lower body 154, intermediate body 156, and upper body 158 may be held together by any suitable means such as by thru-bolts 192, and O-rings may be provided for maintaining appropriate seals therebetween.

FIG. 5 shows a cross-sectional view of the novel exhaust valve 150. The exhaust valve 150 communicates with the inlet passage 12 via a nozzle 186 passing through the wall of the cylindrical valve port 200 portion of the inlet check valve 80. The nozzle 186 is sealed from the intermediate chamber 13 by O-rings 187 or the like. The nozzle 186 communicates between the inlet passage 12 and the upper side of a movable rigid diaphragm 178 in the upper housing 158 portion of the exhaust valve 150. In a similar fashion, communication is made between the intermediate chamber 13 and the lower side of the diaphragm 178 via a port 188 in the upper body portion 40 of the backflow preventer.

Movable diaphragm 178 rides in a cylindrical cavity 190 formed by the upper body 158 and intermediate body 156 portion of the exhaust valve. Attached to the intermediate body 156 and to the top and side portions of the movable rigid diaphragm 178 is a resilient circular diaphragm 180. The resilient diaphragm 180 maintains the inlet passage fluid on the upper side of the solid diaphragm 178 separate from the intermediate chamber fluid on the lower side of the movable diaphragm 178.

As so configured, the rigid diaphragm 178 with its resilient outer member 180 provides a means for comparing the pressure of the fluid in the inlet passage 12 with that in the intermediate chamber 13. As shown in FIG. 5, when the inlet passage pressure is greater than the intermediate chamber pressure, the movable diaphragm 178 moves downwardly in the cylindrical cavity 190. Conversely, when the pressure of the fluid in the intermediate chamber 13 is equal to that in the inlet passage 12, the movable diaphragm 178 moves upwardly in the cylindrical passage 190.

Disposed between the diaphragm 178 and a stationary valve seat 160 with a resilient seating surface 170 attached to the lower body 154 of the exhaust valve 150 is a circular balanced valve member 162. As shown in FIG. 5, the balanced valve member 162 is movable between a valve open and a valve closed position relative to the stationary valve seat 160. A resilient annular diaphragm 166 connects the balanced valve 162 to the lower body 154 for movement therein. In this manner, when the balanced valve is in a valve closed position against the valve seat 160, as shown by the dashed lines in FIG. 5, the fluid in the exhaust valve is prevented from passing to the atmosphere through the lower body 154. The balanced valve 162 moves away from the valve seat 160 as the pressure of the fluid in the intermediate chamber 13 increases relative to the pressure of the fluid in the inlet passage 12.

The novel features of the exhaust valve 150, which provide a greatly increased resistance to transient increases in the pressure of the fluid in the intermediate chamber relative to that in the inlet passage, result from the arrangement of the balanced valve 162 and the movable diaphragm 178. In this regard, the diaphragm 178 communicates with the valve 162 by means of a first spring member 176 positioned between an inner flange 182 on the diaphragm 178 and an upper inner flange 174 on the valve 162. Positioned between the stationary valve seat 160 and a lower inner flange 172 is a second spring member 164.

The first spring member 176 resiliently couples the downward movement of the diaphragm 178, occurring as a result of the inlet passage pressure being greater than the intermediate chamber pressure, to the balanced valve 162 to urge the valve 162 against the valve seat 160 to a valve closed position, thereby preventing passage of the fluid in the intermediate chamber 13 to the atmosphere. By contrast, the second spring 164 urges the valve member 162 to a valve open position in opposition to the downward force of the movable diaphragm 178, as transferred to the valve 162 by the first spring 176. In this manner, when the pressure of the fluid in the inlet passage is greater than the pressure of the fluid in the intermediate chamber, the diaphragm 178 will be urged downwardly by the inlet passage pressure by a sufficient degree to move the valve 162 to a closed position against the resilient portion 170 of the stationary seat 160, thereby preventing the passage of fluid from the intermediate chamber 13 to the atmosphere through the lower body 154.

In a similar manner, when the pressure of the fluid in the intermediate chamber is approximately equal to that of the fluid in the inlet passage, the diaphragm 178 will be moved upwardly by the intermediate passage pressure to an extent whereby the valve 162 is moved by the lower spring 164 away from the stationary seat 160. This opens the intermediate chamber to the atmosphere and exhausts the fluid from the intermediate chamber until the pressure therein drops to a value less than the inlet passage pressure.

The arrangement of the balanced valve 162 and the upper and lower springs 176 and 164 resist the opening of the exhaust valve for only brief changes in the pressure of the intermediate chamber relative to that in the inlet passage. That is, the cooperation between the two spring members 176 and 164 provides a force-absorbing mechanism that causes the diaphragm 178 to move up and down in its cylindrical cavity 190 for only brief changes in the intermediate chamber pressure, without causing the opening of the balanced valve member 162.

The novel arrangement of the exhaust valve not only provides an increased resistance to "spitting" action, but also provides a much more compact design than was previously available in the exhaust valves found in the prior art. The exhaust valve of the present invention would function as a prior art exhaust valve without the first spring 176 and with the movable diaphragm 178 connected directly to the valve 162. Such an arrangement would be subject to "spitting" caused by fluctuations in the line pressure feeding the backflow device. If, for example, the pressure was fluctuating between 40 and 100 psi, when the pressure rose to 100 psi, the pressure in the intermediate chamber would follow this increase and rise to 94 to 96 psi. The downstream pressure would, of course, also rise. When the upstream or supply pressure receded back to the 40 psi level, the outlet check valve would close and prevent water from moving from the outlet passage into the intermediate chamber. However, as the outlet check valve closed, a large pressure differential would be developed across the outlet check valve forcing it tightly against its seat. As a result, there would be a displacement of water into the intermediate chamber. This would cause the intermediate chamber pressure to rise (because the inlet check valve would already be closed).

As the supply pressure increased back to 50 psi, the intermediate chamber pressure would have to fall because the intermediate chamber pressure is always below the inlet passage pressure due to the relative size of the inlet passage and intermediate chamber. The intermediate chamber pressure would have to fall to 44–46 psi. For this to occur, water would have to be forced from the intermediate chamber to the exhaust valve. Thus, the spitting action would result from the lifting of the valve member 162 in response to a displacement of water from the intermediate chamber. This undesireable "spitting" is eliminated with the present invention.

With the resilient connection between the movable diaphragm 178 and the valve member 162, the diaphragm may move upwardly to accommodate the water needed to lower the pressure in the intermediate chamber, without allowing the valve member 168 to loose contact with its seat 160, thereby preventing the "spitting" action. The normal difference in pressure between the inlet fluid pressure and the intermediate chamber fluid pressure is approximately 6 psi. When this pressure falls to 3 psi, the valve member will start to lift from the seat. If the first spring 176 is of proper force and resilience, the diaphragm 178 can move upwardly a considerable amount before the pressure changes from the normal 6 pounds differential to the 3 pounds differential at which the relief valve opens. This movement of the diaphragm allows the system to accommodate changes in displacement that are generated by line pressure fluctuation without having to vent this water to the atmosphere.

As is the case with the other components of the present invention, the upper, intermediate, and lower exhaust valve body members, as well as the movable diaphragm 178 in the balanced valve 162 may be made of molded plastic parts or the like. The compact design of the exhaust valve 150, when combined with the compact design of the inlet and outlet check valves 80 and 100, provides the backflow preventing apparatus of the present invention with an extremely low profile, as well as with an extremely attractive and efficient design.

In the foregoing description of the present invention, a preferred embodiment of the invention has been disclosed. It is to be understood that other mechanical and design variations are within the scope of the present invention. Thus, by way of example and not of limitation, the movable check valve seats could have outer contours differently than described to provide the same camming action between the valve seat and the roller portion of the valve closing mechanism; the valve closing mechanism itself could utilize rollers disposed differently on the movable valve seat; only one roller, attached via a spring to the housing, could be utilized in the valve closing mechanisms; the valve port portions of the check valve could be configured differently than described; different means could be utilized in the exhaust valve to resiliently bias the valve member between open and closed positions; means other than a movable diaphragm in the exhaust valve could be utilized to compare the pressure in the inlet passage with the pressure in the outlet passage; means other than a nozzle could be utilized to sense the pressure of the fluid in the inlet passage; and the movable diaphragm and cylindrical valve members could be configured directly to achieve the desired results. Accordingly, the invention is not limited to the particular arrangement which has been illustrated and described in detail.

What is claimed is:

1. An improved check valve for a backflow preventing valve of the type having a body with an inlet passage for connection to a source of fluid, an intermediate chamber fluidly connected to said inlet passage via a first check valve, and an outlet passage fluidly connected to said intermediate chamber via a second check valve for connection to a receiver of fluid, said check valve comprising:
   stationary valve port means fluidly communicating with said intermediate chamber;
   movable valve seat means for sealing said valve port means, said seat means including ramp means having both inclined and concave ramping surfaces for providing a progressively decreasing opening force as said seat means moves from a valve closed to a valve open position relative to said port means; and
   valve closing means, for urging said seat means to said valve closed position when the fluid pressure in said outlet increases relative to the fluid pressure in said intermediate chamber, said valve closing means being in rolling engagement with said concave ramping surface when said seat means is in said valve closed position and in engagement with said inclined ramping surface when said seat means moves toward said valve open position, whereby said opening force is greater when said closing means engages said concave ramping surface than when said closing means engages said inclined ramping surface, said closing means including stationary shaft means upon which said seat means moves.

2. An improved check valve as defined in claim 1, wherein said valve port means comprises:
   a cylindrical valve opening in said body; and
   sealing ring means for engagement with said seat means.

3. An improved check valve as defined in claim 2, wherein said valve seat means includes:
   ridge means for engaging said sealing ring means when said seat means is in a valve-closed position against said valve port means.

4. An improved check valve as defined in claim 1, wherein said seat means comprises:
   a valve seat having a generally frustoconical surface with an annular recess at one end of said surface, said frustoconical surface comprising said inclined ramping surface and said annular recess comprising said concave ramping surface; and
   axial cavity means for receiving said shaft means, whereby said check valve opens and closes in response to said pressure differential by sliding along said shaft means under urging from said valve closing means.

5. An improved check valve as defined in claim 1, wherein said valve closing means comprises:
   stationary shaft means mounted to said body for sliding engagement with said seat means;
   roller means for contacting said ramping surface on said seat means;
   arm means, operatively connected to said body for arcuate movement in a plane parallel with said shaft means, for positioning said roller means against said ramping surfaces; and
   spring means, interconnecting said arm means, for biasing said arm means, and thus said roller means, against said ramping surfaces, whereby:
   (i) said seat means is moved to a valve open position by the fluid flowing through said check valve when the fluid pressure on the fluid source side of said seat means is greater than the pressure on the fluid receiver side of said seat means plus the biasing force of said spring means, and
   (ii) said seat means is moved to a valve closed position by said spring means, coacting with said roller means, when the flow of fluid through said check valve terminates.

6. An improved check valve as defined in claim 1, wherein:
   said inlet and outlet check valves are disposed within said intermediate chamber, thereby providing said backflow preventer body with a low profile.

7. In a backflow preventing valve having a body with an inlet passage for connection to a source of fluid, an intermediate chamber fluidly connected to said inlet passage via an inlet check valve, an outlet passage fluidly connected to said intermediate chamber via an outlet check valve for connection to a receiver of fluid, an exhaust valve connected to said inlet passage and to said intermediate chamber which vents fluid in said intermediate chamber to the atmosphere when the pressure of fluid in said intermediate chamber is equal to the pressure of said fluid in said inlet passage, the improvement in each check valve comprising:
   valve port means;
   valve seat means for movement between open and closed positions relative to said port means, said seat means including a frustoconical surface and an axial cavity;
   valve closing means, for urging said seat member to a valve closed position, said closing means including:
   stationary shaft means for sliding engagement with said axial cavity;
   roller means for rolling engagement with said frustoconical surface;
   arm means, for positioning said roller means against said seat means; and spring means for biasing said roller means against said frustoconical surface, whereby:

(i) said outlet check valve seat means is urged to said valve closed position by said outlet valve spring means when the fluid pressure in said intermediate chamber is less than the fluid pressure in said outlet passage plus the biasing force provided by said outlet valve spring means and applied to said seat means by said roller means, and (ii) said inlet valve seat means is urged to said valve closed position by said inlet check valve spring means when the fluid pressure in said inlet passage is less than the fluid pressure in said intermediate chamber plus the biasing force of said inlet check valve spring means.

8. In a backflow preventing valve having a body with an inlet passage for connection to a source of fluid, and an intermediate chamber fluidly connected to said inlet passage, an exhaust valve connected to said inlet passage and to said intermediate chamber which vents fluid in said intermediate chamber to the atmosphere when the pressure of fluid in said intermediate chamber is equal to the pressure of said fluid in said inlet passage, said exhaust valve comprising:

a valve body communicating with said intermediate chamber and with said atmosphere;

means for sensing the fluid pressure in said inlet passage;

means for sensing the fluid pressure in said intermediate chamber;

means, communicating with both of said sensing means, for comparing the fluid pressures in said inlet passage and displacement from said intermediate chamber resulting from large reductions in said inlet passage pressure; and balanced valve means, movably mounted to said valve body and resiliently coupled to said comparing means, for providing an opening from said intermediate chamber to said atmosphere only when said intermediate chamber fluid pressure is equal to said inlet passage fluid gressure, whereby said comparing means maintains said valve means in a valve closed position during said reductions in said inlet passage pressure.

9. A backflow preventing valve as defined in claim 8, wherein said comparing means comprises:

movable diaphragm means, in sealing communication with said inlet passage and with said intermediate chamber and resiliently coupled to said balanced valve means, for urging said valve means to a valve closed position when said inlet passage pressure is greater than said intermediate chamber pressure, and for allowing said valve means to open when said intermediate chamber pressure is equal to said inlet passage pressure.

10. A backflow preventing valve as defined in claim 9, wherein said balanced valve means comprises:

moveable valve means;

first biasing means, positioned between said diaphragm means and said valve means, for transferring the valve closing force of said diaphragm means to said valve means and for allowing said diaphragm means to move away from said valve means to absorb said fluid displacement while maintaining said valve closing force on said valve means; and second biasing means, positioned between said valve means and said valve body, for urging said valve means to a valve open position when said intermediate chamber pressure is equal to said inlet passage pressure and for resisting said valve closing force of said diaphragm means, whereby said valve means is movably and resiliently positioned between said first and second biasing means, with the ratio of the resiliencies of said first and second biasing means determining the amount of said fluid displacement said diaphragm means can absorb and yet urge said valve means to said valve closed position, thereby preventing said opening for only transient fluxuations in said inlet passage pressure.

11. A backflow preventing valve as defined in claim 9, wherein:

said means for sensing said inlet pressure comprises nozzle means in sealing communication between said inlet passage and with one side of said diaphragm means; and said means for sensing said intermediate chamber pressure comprises port means in sealing communication with said intermediate chamber and with the other side of said diaphragm means.

12. A backflow preventing valve as defined in claim 10, wherein:

(a) said diaphragm means comprises:

(i) a rigid diaphragm communicating on opposite sides with said nozzle means and with said port means, and (ii) a resilient diaphragm attached between said valve body and said diaphragm, whereby said resilient diaphragm allows said rigid diaphragm to freely move in said valve body in response to the difference in pressure of the fluid in said inlet passage and the fluid in said intermediate chamber;

(b) said balanced valve means comprises:

(i) a valve seat rigidly attached to said valve body, (ii) a hollow valve member movable against said valve seat to said closed position, and (iii) a resilient annular diaphragm connected between said valve body and said hollow valve member;

(c) said first biasing means comprises a first spring member disposed between said rigid diaphragm and said hollow valve member;

(d) said second biasing means comprises a second spring member disposed between said hollow valve member and said valve seat, whereby until the pressure differential between said inlet passage pressure and said intermediate chamber pressure equals the valve opening force provided by said first spring member, said rigid diaphragm may move away from said hollow valve member to absorb said displacement, and yet maintain said hollow valve member in a valve closed position, thereby resisting the opening of said exhaust valve for only brief changes in said said inlet passage pressure.

13. An exhaust valve for a backflow preventing valve having a body with an inlet passage for connection to a source of fluid, and an intermediate chamber fluidly connected to the inlet passage, said exhaust valve being connected to said inlet passage and to said intermediate chamber to vent fluid in said intermediate chamber to the atmosphere when the pressure of the fluid in said intermediate chamber is greater than the pressure of said fluid in said inlet passage, said exhaust valve resisting said venting of said fluid for transitory flucuations in said inlet passage pressure and comprising:

valve body means including a diaphragm cavity communicating with said inlet passage and with said intermediate chamber and an exhaust port communicating with the atmosphere;

diaphragm means, resiliently attached to said valve body means for movement within said diaphragm cavity and having diaphragm portions separately communicating with said inlet passage and with said intermediate chamber;

means, resiliently attached to said body means for opening said exhaust port to the atmosphere; and biasing means, positioned between said diaphragm means and said opening means and between said opening means and said valve body means, for supporting said opening means in a balanced manner, whereby:

(i) as said inlet passage pressure increases, said diaphragm means moves toward said opening means and said biasing means resiliently transfers said movement to said opening means to position said opening means to close said exhaust port, and (ii) as said intermediate chamber pressure increases, said diaphragm means moves away from said opening means, thereby allowing said biasing means to position said opening means to open said exhaust port, said biasing means resiliently resisting said opening of said exhaust port for transistory changes in said inlet passage pressure.

14. An improved backflow preventing valve as defined in claim 13, wherein said biasing means comprises:

first spring means, positioned between said diaphragm means and said opening means, for transferring said movement of said diaphragm means to said opening means and for allowing said diaphragm means to move away from said opening means to absorb transitory increases in the volume of fluid in said intermediate chamber; and second spring means, positioned between said opening means and said valve body means, for urging said opening means to open said exhaust port, whereby:

(i) when said inlet passage pressure is greater than said intermediate chamber pressure, said opening means is moved to close said exhaust port, and (ii) when said intermediate chamber pressure is equal to said inlet pressure, said opening means is moved to open said exhaust port, with said springs and diaphragm means resisting the opening of said exhaust port for brief reductions in said inlet passage pressure by absorbing said increase in the volume of fluid in said intermediate chamber produced by said reductions.

15. A backflow preventing valve as defined in claim 14, wherein:

(a) said exhaust valve further comprises:

(i) nozzle means, communicating with said inlet passage and said diaphragm cavity, for transferring said inlet passage pressure to one side of said diaphragm means, and (ii) port means communicating with said intermediate chamber and with said diaphragm means, for transferring said intermediate chamber pressure to the other side of said diaphragm means;

(b) said diaphragm means comprises a generally cylindrical member sealingly communicating at its outer portion with said inlet passage pressure transferred through said nozzle means and sealingly communicating at its inner portion with said intermediate chamber pressure transferred by said port means, said cylindrical member including an annular flange for receiving one end of said first spring means and further including a resilient annular diaphragm attached to said diaphragm cavity for allowing said movement in said cavity and for maintaining said seal between said inlet passage pressure and said intermediate chamber pressure; and (c) said opening means comprises:

(i) a generally hollow cylindrical valve member having annular flanges for receiving said the other end of first spring means and one end of said second spring means, (ii) a resilient annular diaphragm attaching said cylindrical member to said valve body means for balanced linear movement in said body means to open and close said exhaust port, and (iii) a stationary valve seat rigidly attached to said body means for receiving the other end of said second spring means and for receiving said cylindrical member to close said exhaust port.

* * * * *